March 17, 1970     M. KESSLER     3,501,208

PLASTIC BALL BEARINGS

Filed March 5, 1968

INVENTOR
Milton Kessler

BY    *Max L. Libman*

ATTORNEY

United States Patent Office 3,501,208
Patented Mar. 17, 1970

3,501,208
PLASTIC BALL BEARINGS
Milton Kessler, 6690 Harrington,
Youngstown, Ohio 44512
Filed Mar. 5, 1968, Ser. No. 710,549
Int. Cl. F16c 33/00; B21h 1/12, 1/14
U.S. Cl. 308—190                                    1 Claim

ABSTRACT OF THE DISCLOSURE

An all-plastic ball bearing comprises an inner race and an outer race; the former comprising two identical mating parts which when attached together form on the outer circumference thereof an annular semi-race; the latter comprising two identical mating parts which when attached together form on the inner surface a second annular semi-race matching and complementing the first semi-race, said bearing being assembled with bearing balls in the race and with the respective mating members firmly joined to each other.

---

This invention relates to plastic ball bearings, and to a method for manufacturing them.

Ball bearings have found a vital place in the machinery of modern industry. Recently, new developments in ball bearings which have races formed of synthetic resins have found a vital and popular place in the modern home. Small ball bearings having races of plastics are being used for exterior sliding doors, such as screen and storm doors, for glass shower and bath enclosures which are slidably mounted, and for cabinet and closet doors. In each of these instances, ease of action as well as silence is important. In addition, many of the modern synthetic resins such as Nylon, Dacron, Teflon, and the like, are self lubricating or have an inherent low coefficient of friction. The wide use of such bearings is assured. The inexpensive manufacture of such bearings in large quantities is not yet assured.

In the past, one of the favorite methods of making ball bearings having races of synthetic resins was to mold the inside race and the outside race separately, place the bearing balls in position, and then stretch a portion of the outside race to admit the inside race with the balls in place. Great reliance was placed on the resilience of the resin. However, to provide a race with an outer edge sufficiently resilient to admit the inner race meant that the outer race edge was thin. In addition, such bearings were easily distorted under load, and often, when left in the same position supporting a load for a long time, the bearing could acquire a set and lose its roundness. In short, the prior art bearings and the methods of manufacturing them had shortcomings.

It is an object of this invention to provide a new and improved ball bearing. It is another object of the invention to provide a new and improved ball bearing having races of synthetic resin.

It is a further object of this invention to provide a new and improved method of manufacturing ball bearings. It is yet another object of this invention to provide a new and improved method for manufacturing ball bearings having synthetic resin races. It is still a further object of this invention to provide a new and improved method for manufacturing ball bearings in quantity inexpensively.

Other objects and advantages of this invention will become apparent as the following description proceeds, which description should be considered together with the accompanying drawings, in which.

Figure 1:
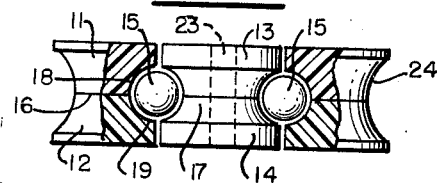
FIG. 1 is an elevational view, partly in section, of a ball bearing according to the invention.

Referring now to the drawings in detail, the reference character 11 designates one-half of the outer race of the bearing of this invention. For ease in molding, the outer race is made in two identical parts, 11 and 12. Actually, large numbers of the part 11 are molded, and two such parts are assembled together to form the outer race. The inner race is likewise formed of two identical portions 13 and 14. As shown assembled in FIG. 1, the inner race has a concavity 19 about its outer circumference of a diameter to accommodate a bearing ball 15. This forms one half of the ball track. The outer race when assembled has a mating concavity 18 which is of the same diameter as the concavity 19. When the inner and outer races are assembled, the two concavities 18 and 19 together form an annular ball track having a circular section sufficient in size to accommodate several bearing balls 15. The inner race then rotates upon the balls 15, which in turn ride on the outer race. The two portions 11 and 12 of the outer race are joined at a seam 16, and the two portions 13 and 14 of the inner race are joined at a seam 17. As better shown in FIG. 2, the inner race has a central perforation 22 for mounting upon a shaft or support. The outer race has a groove 24 around its outer periphery in which a tire or O-ring can be mounted, or which may support any of many curved objects. Both the inner perforation 23 and the outer curved groove 24 may be modified to meet individual situations without departing from this invention.

As mentioned above, the races are formed by the assembly of two identical parts. Thus, in manufacturing the ball bearings of this invention, a suitable synthetic resin may be molded into large numbers of identical parts 11 and 13. Only two molds are required. In addition, each of the parts 11 and 13 are so formed that they may be molded in a conventional two-part mold with all surfaces arranged so that the mold halves may be readily separated and so that the molded part may be readily stripped from the open mold. This has not been the case with many of the prior art devices.

Figure 2:
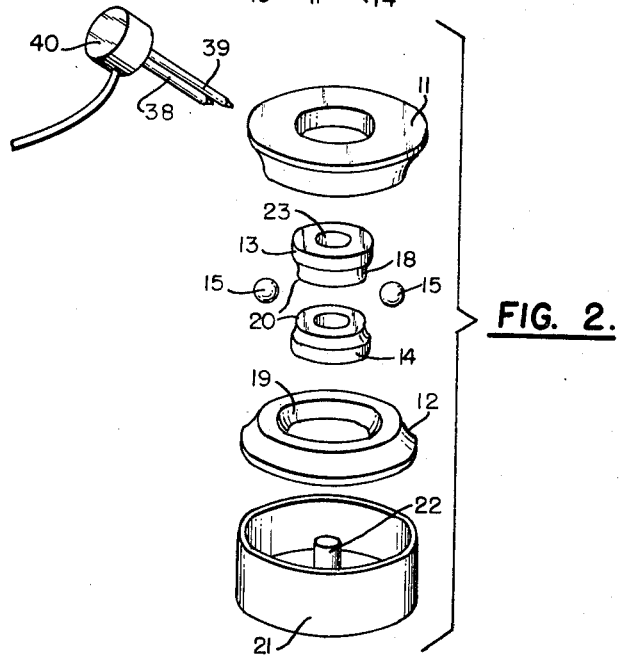
FIG. 2 is an exploded view of a ball bearing according to the invention in the process of assembly.

The method of assembling the bearing itself is illustrated in FIG. 2. A jig 21 of generally cylindrical shape and of sufficient size to readily accommodate one of the halves 11 of the outer race, has an upstanding inner pin 22 which is large enough to readily pass through the central perforation 23 of the inner parts 13 and 14 without binding therein. A part 12 of the outer race is inserted first in the jig 21 which holds it in place. Then a part 14 of the inner race is placed within the part 12 and over the pin 22. In this position, the two members 12 and 14 in the jig 21 form one half of the ball track which will receive the balls 15. The bearing balls 15 are preferably of metal, and are placed in the track formed for them in the two parts 12 and 14. Then the other portion 13 of the inner race is placed upon the part 12 and the other portion 11 of the outer race is placed in position. At this time, a supersonic welder 37, having a transducer 40 and a pair of welding prongs 38 and 39, is moved toward the assembly in the jig 21. The two prongs 38 and 39 are designed to simultaneously contact the top part 11 of the outer race and the top part of the inner race. The mechanical vibrations developed by the welder 31 causes the plastic of the parts 11, 12, 13 and 14 to melt and flow together at the seams 16 and 17. However, neither the jig 21 nor the balls 15 are affected. Thus, the welder joins the parts together into a single bearing with no straining of the parts during assembly. In addition, the balls 15 are free to rotate between the two races.

Since there is a slight tendency of the plastic material to flow during the welding operation, the outer edges of the faces of the parts 11, 12, 13 and 14 are curved or undercut slightly as shown at 20 and 30. This permits the softened plastic to flow slightly without leaving a flashing projecting into the ball track to impede the free movement of the balls 15.

Figure 3:
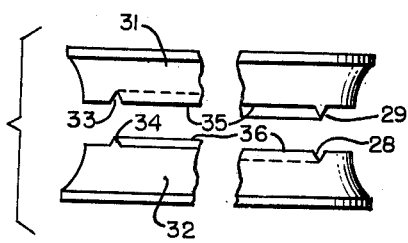
FIG. 3 is a partial elevational view of a modification of the outer race of the bearing of this invention.

The thin ridge or flashing which is formed when plastic materials are welded together would serve to impede the free movement of the balls 15 if it projected into the ball track. So, also, would the ridge that would be formed if the two portions 11 and 12, or 13 and 14, of the two races were not accurately and correctly aligned when they were welded. Even a slight displacement between the parts of the same race would leave a step in the track which would greatly reduce the effectiveness of the bearing. To avoid such a development in the assembly of the parts, mating index elements may be provided in the molded parts. This is more clearly shown in FIG. 3, wherein, by way of illustration, portions of two parts, 31 and 32, of an outer race are shown. The upper part 31 has formed in its lower surface 35, the surface which mates with a cooperating surface 36 of the lower part 32, a small notch 33 at the left. The notch 33 can be concentric with the center of the part 31 and it may be continuous about the entire surface 35, or it can be extended for only 180° if desired. In fact, as shown on the right of FIG. 3, one-half of the surface 35 may contain a ridge 29. On the mating surface 36 of the lower part 32 is a mating ridge 34 on the left. Again, if the notch 33 is continuous about the entire surface 35, then the ridge 34 is also. However, if the notch 33 is replaced through half of the surface 35 by the ridge 29, then the ridge 34 extends over only one-half of the surface 36 and is replaced on the other half by a notch 28 which mates with the ridge 29. In this manner, the two parts 31 and 32 may be identical. When the two parts 31 and 32 are assembled in the jig 21, the ridge of one part will tend to enter the notch in the other and accurately align the two parts 31 and 32. This arrangement is not limited to the outer race only, of course, but may be utilized in the assembly of the inner race as well.

The above specification has described a new and improved ball bearing and a method of manufacturing such a ball bearing which utilizes substantially identical molded parts so shaped as to be readily and cheaply molded of a synthetic resin in an inexpensive two-part mold, which parts may be readily removed from the mold, and which may be fabricated at small cost. The invention further contemplates the rapid and inexpensive assembly of the parts using an inexpensive jig and an inexpensive welding device to provide a strong, smoothly-operating ball bearing which is long-lasting and quiet in operation. It is realized that this disclosure may suggest to others in the art other ways in which the principles of this invention may be used. It is, therefore, intended that this invention be limited only by the scope of the appended claim.

I claim:
1. A ball bearing comprising
   (a) an outer race formed of a synthetic resin and having a first central perforation,
   (b) said outer race comprising a first part and a second part, said first and second parts having essentially the same shape and each having a junction surface lying in a central plane perpendicular to the axis of the bearing,
   (c) said two junction surfaces mating and being attached together,
   (d) said first and second parts each forming one-half of said outer race and being symmetrical about said central plane of attachment,
   (e) said outer race having a smooth groove formed centrally about the inner surface of said outer race,
   (f) an inner race adapted to fit freely inside said first central perforation, said inner race comprising a third part and a fourth part both formed of a synthetic resin, said third part and said fourth part having essentially identical shapes,
   (g) each of said third and fourth parts forming when joined together one-half of said inner race and being symmetrical about the plane of joining,
   (h) said inner race having a smooth groove formed about its outer periphery,
   (i) the face of each of said first and third parts which joins with the corresponding face of the second and fourth parts respectively having an arcuate groove formed therein concentric with said central perforations, and extending no more than 180°, and an arcuate ridge on each of said parts mating with the groove of the adjoined part, whereby the parts are accurately aligned.

References Cited

UNITED STATES PATENTS

| | | | |
|---|---|---|---|
| 2,995,405 | 8/1961 | Ferdig | 308—190 |
| 3,256,051 | 6/1966 | Howe | 308—201 |
| 3,343,895 | 9/1967 | Morrison | 308—196 |

FOREIGN PATENTS

| | | |
|---|---|---|
| 291,867 | 12/1931 | Italy. |

MARTIN P. SCHWADRON, Primary Examiner

F. SUSKO, Assistant Examiner

U.S. Cl. X.R.

29—148.4